G. W. MacKENZIE.
VACUUM CLEANING APPARATUS.
APPLICATION FILED MAY 3, 1912.
Reissued June 11, 1912. 13,427.
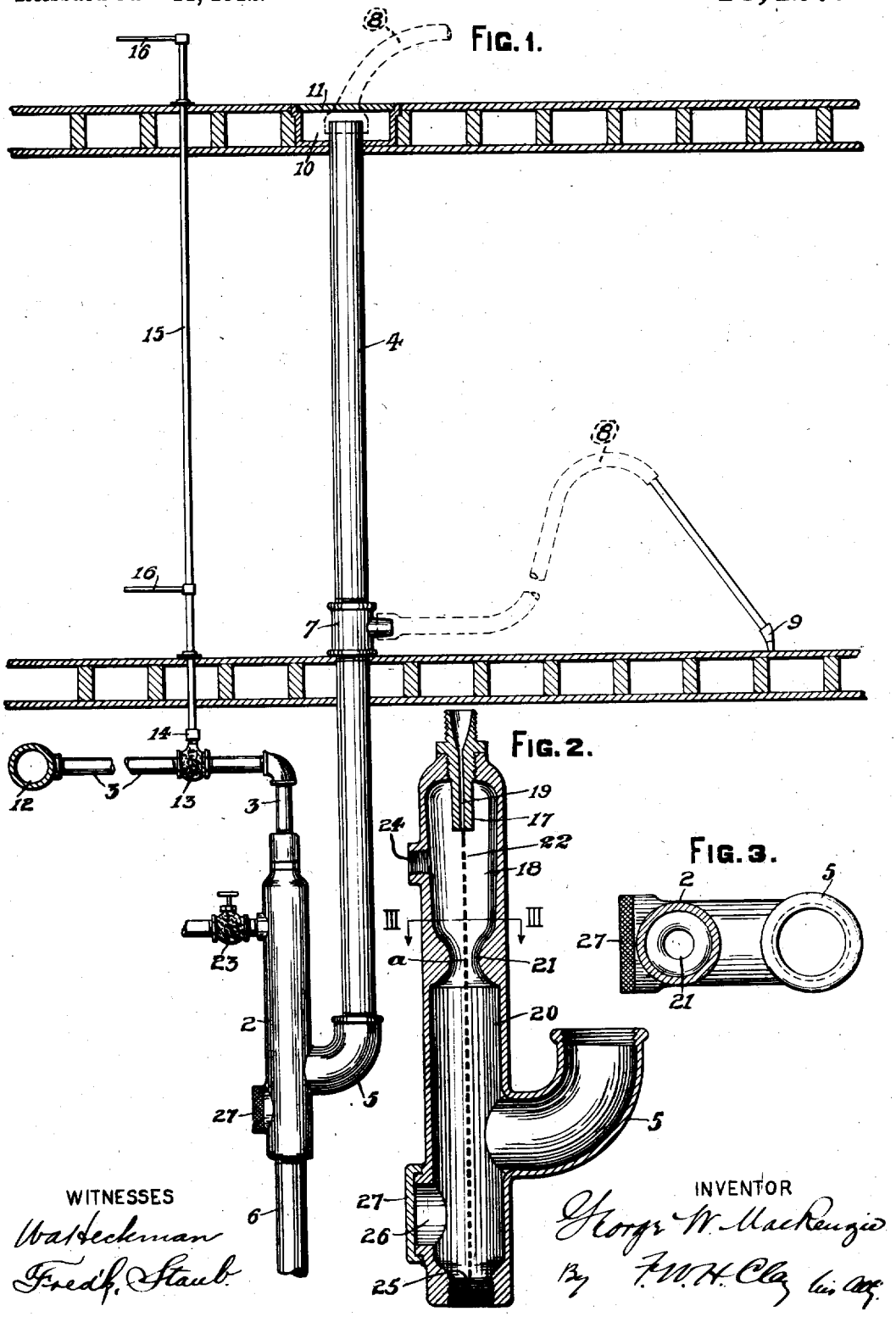

UNITED STATES PATENT OFFICE.

GEORGE W. MACKENZIE, OF BEN AVON, PENNSYLVANIA, ASSIGNOR TO THE HYDRAULIC VACUUM CLEANING COMPANY, OF PITTSBURGH, PENNSYLVANIA, A CORPORATION OF DELAWARE.

VACUUM CLEANING APPARATUS.

13,427. Specification of Reissued Letters Patent. Reissued June 11, 1912.

Original No. 999,325, dated August 1, 1911, Serial No. 577,109. Application for reissue filed May 3, 1912. Serial No. 694,962.

*To all whom it may concern:*

Be it known that I, GEORGE W. MACKENZIE, a citizen of the United States, residing at No. 8 Monitor street, Ben Avon, in the county of Allegheny and State of Pennsylvania, have invented certain new and useful Improvements in Vacuum Cleaning Apparatus, of which the following is a specification.

My invention consists of an improvement in vacuum cleaning apparatus and is designed for the purpose of utilizing water pressure to produce exhausting suction by means of an improved aspirating pump and the connected piping equipment therefor, constructed and adapted to operate in the manner hereinafter described.

Generally stated, the device comprises a casing suitably formed to provide a vacuum chamber and a suction chamber connected by a reduced communicating opening, the vacuum chamber having a water jet nozzle and the suction chamber having a suction connection for the exhaust pipe of the cleaning tool. In the drawings: Figure 1 represents the mechanism as installed for use in a house. Fig. 2 is an enlarged vertical sectional view through the vacuum siphon. Fig. 3 is a horizontal sectional view on the line III. III. of Fig. 2.

Ordinarily in vacuum cleaning installations and apparatus of various constructions in common use, the dust, etc., is removed from the surface being cleaned by suction and is delivered into a receiving compartment which must be emptied from time to time. My invention contemplates the use of any elastic fluid pressure from any available source as an ordinary water supply system of sufficient pressure whereby to produce a suction current through a stand pipe and my improved aspirating pump, the waste fluid together with the collected dirt, finally passing to the sewer or other suitable point of discharge.

In the drawings, 2 represents the aspirating pump having a water supply pipe 3 introduced at its upper end, a suction stand pipe 4 extending up through one or more of the floors of a building as shown and connected with the lateral elbow 5 of the aspirating pump, and an outlet or waste connection 6 leading to the sewer. The stand pipe 4 as stated, extends upwardly through the floors of a building to any desired height and is provided at each floor with a T connection 7, to the terminal of which the end of an ordinary hose 8 may be attached provided with the cleaning tool or suction nozzle 9 of any suitable construction. The hose 8 and its cleaning tool are well known elements and may be of any desired design or length as to hose, to suit the use intended. At its upper terminal, the stand pipe 4 preferably extends into a box 10 having a cover 11 located in the topmost floor, the cover being removable to permit of the attachment of the hose 8 as indicated.

The water supply pipe 3 is connected with the main 12 directly or by any intervening connections, whereby to conduct the water under pressure to the injection nozzle of the pump 2. Pipe 3 is provided with a controlling valve 13 and a key 14 therefor having an elongated stem 15 extending upwardly through the floors as shown, and having a handle 16, by which the valve may be opened or closed from any floor.

The pump 2, shown in detail in Figs. 2 and 3, consists of a casing provided at its inlet end with the injection nozzle 17 referred to. Said nozzle extends inwardly into the interior chamber 18 at the inlet end of the pump, being preferably screwed into the end of the casing as shown, having a very small jet opening 19 extending therethrough, and connected with pipe 3 by any suitable coupling mechanism. The stand pipe connection 5 may be in the form of an elbow as shown, of an interior area approximating the area of the cross sectional opening of the main upper portion of the pump and leads into the interior 20 thereof at the lower portion as shown. Between the chamber 20 and the chamber 18 at the upper end, the cross area of the chamber is materially reduced, as at *a* by means of a restricting inner annular projection 21, providing a reduced opening for the column 22 passing from the nozzle 17. In practice I have secured good results by a pump having an interior cross area of two inches in diameter, restricted to ¾ of an inch at the point 21, and located about half way between the end of the injection nozzle 17 and the point of connection of the lateral elbow 5. 23 is a valve controlling inflow of air from the outside to chamber 18 through a small port 24, and whereby the air supply may be accurately controlled or entirely cut off. The supply of air therethrough is within the control of the operator and is dependent on local or other conditions, as the head of fluid, its pressure, the use to which the device is being put, or other conditions which may arise in practice. When thus constructed, and water is introduced through the jet opening 19 of the injection nozzle under high pressure, it passes into vacuum chamber 18, through the reduced opening *a* within restriction 21 and then through suction chamber 20, into which the pipe 4 discharges, passing to the sewer or other waste discharge. It will be observed that the opening into waste pipe 6 is considerably restricted as indicated at 25, the interior of the chamber at such point being preferably rounded as shown, whereby to facilitate passage of the water and induced air and impurities toward and into the sewer connection.

For the purpose of giving access to the outlet end of the device for removal of any foreign substance, as matches, etc., which may lodge across the outlet 25, I have provided a lateral opening 26 covered by a screw cap 27, rendered fluid-tight in any suitable way.

It will be understood that when attachment is made with any one of the connections 7, or with the top of the stand pipe 4, all of the other connections are closed so as to utilize the full effect of the pump.

In operation, the outflow of the column of water from nozzle 17 through chamber 18 and the reduced opening *a* formed by the annular stricture 21 and into chamber 20 toward the sewer connection, creates a strong suction through the branch connection 5 and stand pipe 4, of ample power to draw through the terminal 9 and hose 8 all loose impurities, dust, etc., from any surface to which the cleaning tool is applied. These pass, with the air, directly into contact with the water column 22 and are carried thereby into the waste, the operation being continued as long as the current is supplied. The form of the column emitted from nozzle 17, and its volume, may be controlled by the size of the opening 19 and the pressure admitted through valve 13, and also, to an extent, by the controlling valve 23 when used. The restriction 21 lies at a distance beyond the nozzle 17, leaving sufficient opening for the passage of the column 22 as shown, and effects the exhaustion of the air of chamber 18 as soon as the machine is started, thereby tending to produce a partial or practically complete vacuum therein. The result of this construction is to utilize the force of the propelled column 22 and its tendency to expand and fill the restricted opening *a* by the exterior film or misty envelop surrounding the water column, which is atomized or sprayed on its surface, thereby effecting exhaustion of air from chamber 18. By admitting a limited amount of air through port 24 the action of the water column in passing through chamber 18 and opening *a* may be accurately regulated, effecting to a degree the diffusion of the outer particles of water surrounding the column. The operation of the column passing through chamber 18 and restricted opening *a* is to effect a continuous exhaust of the air from the chamber and a resulting condition of vacuum. This produces a corresponding inflow of air to chamber 20 through connection 5, carrying with it the dust, etc., entering through suction nozzle 9, which is thus carried out with the water through the waste terminal.

In practice, the invention is capable of producing ample suction for all ordinary purposes. In fact, with the pump of sufficient size and with correspondingly enlarged pipe connections and a suction nozzle made in proportion, the invention may be readily adapted for street cleaning purposes, whereby all refuse, dirt, rubbish, etc., which is capable of being gathered through the suction nozzle 9 may be discharged directly into the sewer, whereby to avoid the necessity of any sweeping, hauling, etc.

The invention is eminently practicable, capable of long continued use without deterioration, greatly simplifies the disposition of the collected dirt, etc., and is economical to install and equip.

What I claim is:—

1. An aspirating pump consisting of a cylindrical hollow chamber provided with an annular restriction, a fluid inlet jet at one end of said chamber having a reduced aperture, a waste connection at the other end of the chamber beyond the said restriction, and a lateral air suction connection between the waste connection and said restriction, substantially as set forth.

2. An aspirating pump consisting of a cylindrical hollow chamber provided with an annular restriction, a fluid inlet jet at one end of said chamber having a reduced aperture, an air port opening to the interior of the chamber between the annular restriction and the fluid inlet jet, a waste connection at the other end of the chamber beyond the said restriction, and a lateral air suction connection between the waste connection and said restriction, substantially as set forth.

3. An aspirating pump consisting of a cylindrical hollow chamber provided with an annular restriction, a fluid inlet jet at one end of said chamber having a reduced aperture, a valve-controlled air port opening to the interior of the chamber between the annular restriction and the fluid inlet jet, a waste connection at the other end of the chamber beyond the said restriction, and a lateral air suction connection between the waste connection and said restriction, substantially as set forth.

4. An aspirating pump consisting of a cylindrical hollow chamber provided with an annular restriction, a fluid inlet jet at one end of said chamber having a reduced aperture, a waste connection at the other end of the chamber beyond the said restriction, a covered opening leading into the chamber near its waste connection, and a lateral air suction connection between the waste connection and said restriction, substantially as set forth.

5. An aspirator consisting of a vacuum chamber provided with an annular restriction, a fluid inlet jet at one end of said chamber, an outlet opening at the other end of the chamber beyond said restriction, and a lateral air suction connection between the outlet opening and said restriction.

6. In an aspirator, the combination of a casing embodying a vacuum chamber and a suction chamber having a reduced intervening communicating opening, a jet nozzle extending into the vacuum chamber, and an air connection opening into the suction chamber.

7. In an aspirator, the combination of a casing embodying a vacuum chamber provided with an air inlet valve and a suction chamber having an air connection and a waste delivery opening, said chambers being connected by a restricted communicating opening, and a jet nozzle extending into the vacuum chamber.

8. An aspirator consisting of a casing provided with a vacuum chamber and a suction chamber communicating therewith through an intervening restricted opening and having an air inlet opening and a waste delivery opening, and a jet nozzle extending into the vacuum chamber and adapted to pass a column of water through the vacuum chamber, restricted opening, and suction chamber.

9. A casing embodying a vacuum chamber, a restricted opening, and a suction chamber in longitudinal alinement, said suction chamber having a lateral air inlet opening and an endmost delivery opening, and a jet nozzle extending into the end of the vacuum chamber in alinement with the restricted opening and adapted to propel a stream of water therethrough having an exterior adapted to substantially close the restricted opening and to exhaust the air from the vacuum chamber.

In testimony whereof I have hereunto set my hand and seal this 30th day of April, A. D. 1912.

GEORGE W. MACKENZIE. [L. S.]

In presence of—

C. M. CLARKE,

FREDK. STAUB.